United States Patent [19]
Siltanen

[11] Patent Number: 5,593,007
[45] Date of Patent: Jan. 14, 1997

[54] SHOCK ABSORBER WITH THIRD FLUID CHAMBER

[75] Inventor: Pekka Siltanen, Upplands Vasby, Sweden

[73] Assignee: Yamaha Hatsudoki Kabushiki Kaisha, Iwata, Japan

[21] Appl. No.: 160,614

[22] Filed: Dec. 1, 1993

[30] Foreign Application Priority Data

Dec. 2, 1992 [JP] Japan .................................. 4-345151

[51] Int. Cl.$^6$ ............................................... F16F 9/46
[52] U.S. Cl. ........................ 188/269; 188/314; 188/320
[58] Field of Search ................................... 188/269, 282, 188/314, 315, 318, 320, 322.14; 267/64.26, 64.24; 280/707, 714

[56] References Cited

U.S. PATENT DOCUMENTS

| | | | |
|---|---|---|---|
| 4,973,854 | 11/1990 | Hummel | 188/299 X |
| 5,263,559 | 11/1993 | Mettner | 188/299 |

FOREIGN PATENT DOCUMENTS

| | | | |
|---|---|---|---|
| 3932287 | 4/1991 | Germany | 188/269 |
| 34809 | 1/1987 | Japan | 188/315 |
| 301115 | 12/1988 | Japan | 188/269 |
| 9003283 | 4/1990 | WIPO | 188/269 |

*Primary Examiner*—Josie Ballato
*Attorney, Agent, or Firm*—Knobbe, Martens, Olson & Bear

[57] ABSTRACT

A number of embodiments of tubular type shock absorbers that permit improved damping characteristics in both directions by providing a third fluid chamber that surrounds the central shock absorber portion which defines the normal first and second fluid chambers separated by a piston connected by a piston rod to one of the two suspended elements. An annular piston is connected to the piston rod and displaces fluid from the third fluid chamber through a shock absorbing arrangement for augmenting the shock absorbing action of the centrally positioned shock absorber. Several embodiments of reservoir arrangements are disclosed.

13 Claims, 5 Drawing Sheets

5,593,007

SHOCK ABSORBER WITH THIRD FLUID CHAMBER

BACKGROUND OF THE INVENTION

This invention relates to a shock absorber and more particularly to an improved shock absorber that permits better control of damping in both directions of operation.

The use of tubular-type shock absorbers for a wide variety of applications is well known. Such shock absorbers include a cylinder in which a piston is supported for reciprocation to define two fluid chambers. A piston rod is connected to the piston and extends through one of the chambers for connection to one of the two elements to be suspended. The cylinder is connected to the other of the two elements so that the volume of the two chambers vary as the elements move relative to each other. Normally, damping valves are provided within the assembly one of which permits controlled flow from the chamber in which the piston rod extends to the other chamber upon extension of the shock absorber. The other chamber is connected to a reservoir and a further valve means is provided in this connection for controlling the damping flow in the other direction.

A disadvantage with this type of construction is that when the device is undergoing a compression stroke, the actual volume of the fluid for use in the shock absorbing function that is displaced by the piston rod in the chamber through which it extends.

This type of shock absorber is frequently used in vehicle suspension systems and it is desirable to provide a relatively low damping force under low piston speeds so as to improve ride quality. However, vehicles are frequently driven over rough roads and particularly at high speeds and when this is the case then damping forces must be substantially increased.

However, with this type of device it is well known that the amount of fluid displaced normally in the contraction mode is only that displaced by the cross-sectional area of the piston rod in the chamber in which it passes. Thus, in order to obtain high damping forces, extremely small orifices must be required or the piston rod diameter substantially increase. However, both of these expedients then adversely affect the damping operation in the opposite direction.

It is, therefore, a principal object of this invention to provide an improved shock absorber that permits wide latitude in damping rates in both directions.

It is a further object of this invention to provide an improved tubular type of shock absorber that will offer greater latitude of damping control while still maintaining a compact size.

It is a further object of this invention to provide an improved shock absorber arrangement for vehicle suspension systems wherein damping can be effectively controlled in both directions with a compact and relatively simple construction.

SUMMARY OF THE INVENTION

This invention is adapted to be embodied in a tubular shock absorber comprised of an inner cylinder that defines a bore closed at opposite ends and in which a piston is supported for reciprocation. The piston divides the cylinder bore into first and second chambers and a piston rod is affixed to the piston and extends through the first chamber for connection to a first element. Means connect the inner cylinder to a second element and the first and second elements are relatively moveable for causing movement of the piston within the cylinder bore. An outer cylinder is fixed telescopically to the inner cylinder and defines an annular chamber there around. An annular piston is received in the outer cylinder in the annual chamber to define at least a third fluid chamber. The annular piston is fixed for the movement with the piston rod for at least a portion of its stroke for displacing fluid from the third chamber upon movement of the piston rod in a first direction to compress fluid in the second fluid chamber. A reservoir chamber is provided for receiving fluid displaced from the third fluid chamber. First damping valve means are positioned in the piston for restricting the flow from said first chamber to said second chamber for controlling the damping of the movement of the first and second elements in one direction. Second damping valve means are provided for restricting the flow from the third fluid chamber to the reservoir for control damping of the relative movement of the first and second elements in the opposite direction.

DETAILED DESCRIPTION OF THE PREFERRED EMBODIMENTS OF THE INVENTION

Figure 1:
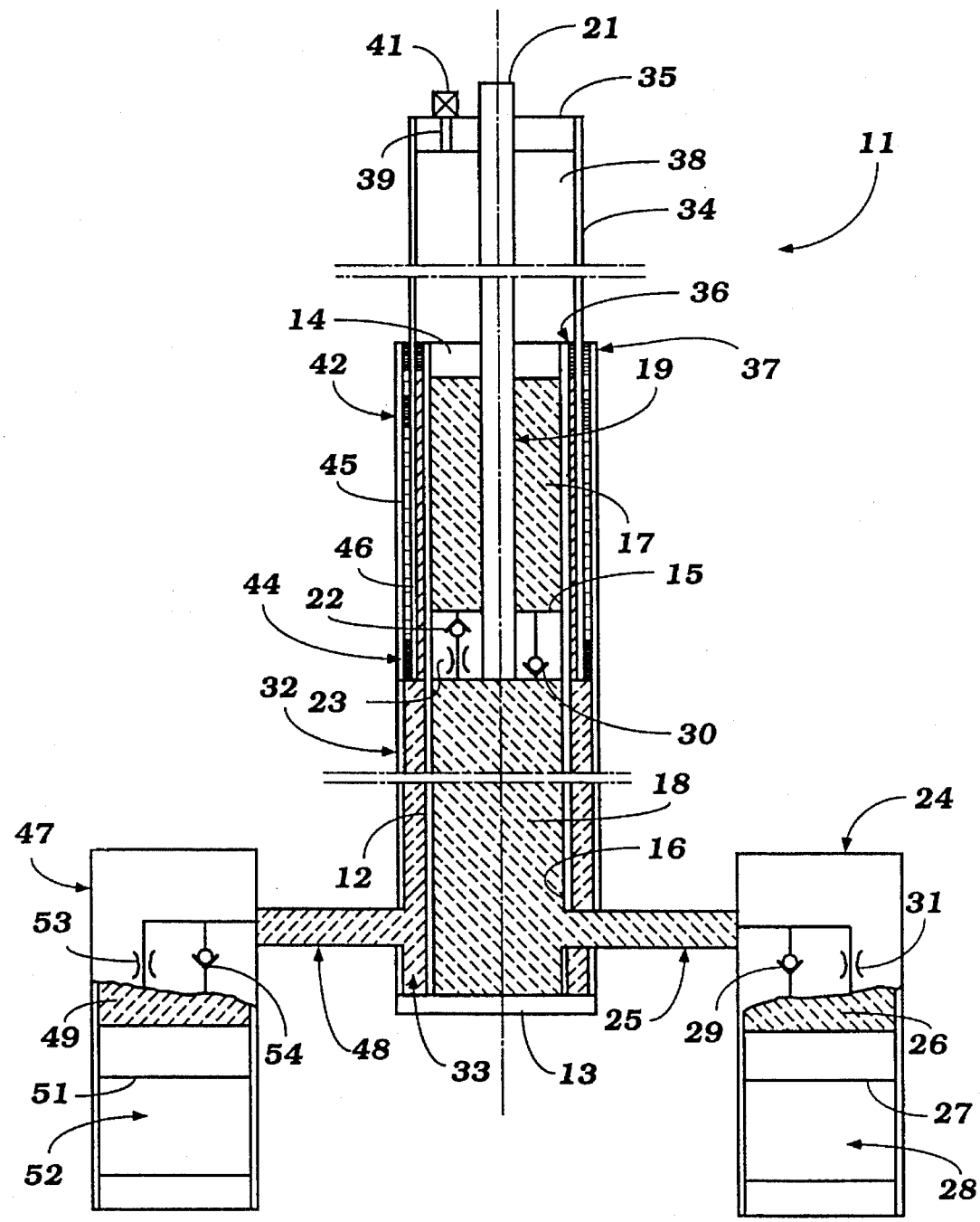
FIG. 1 is a partially schematic cross-sectional view taken through a shock absorber constructed in accordance with a first embodiment of the invention.
Figure 2:
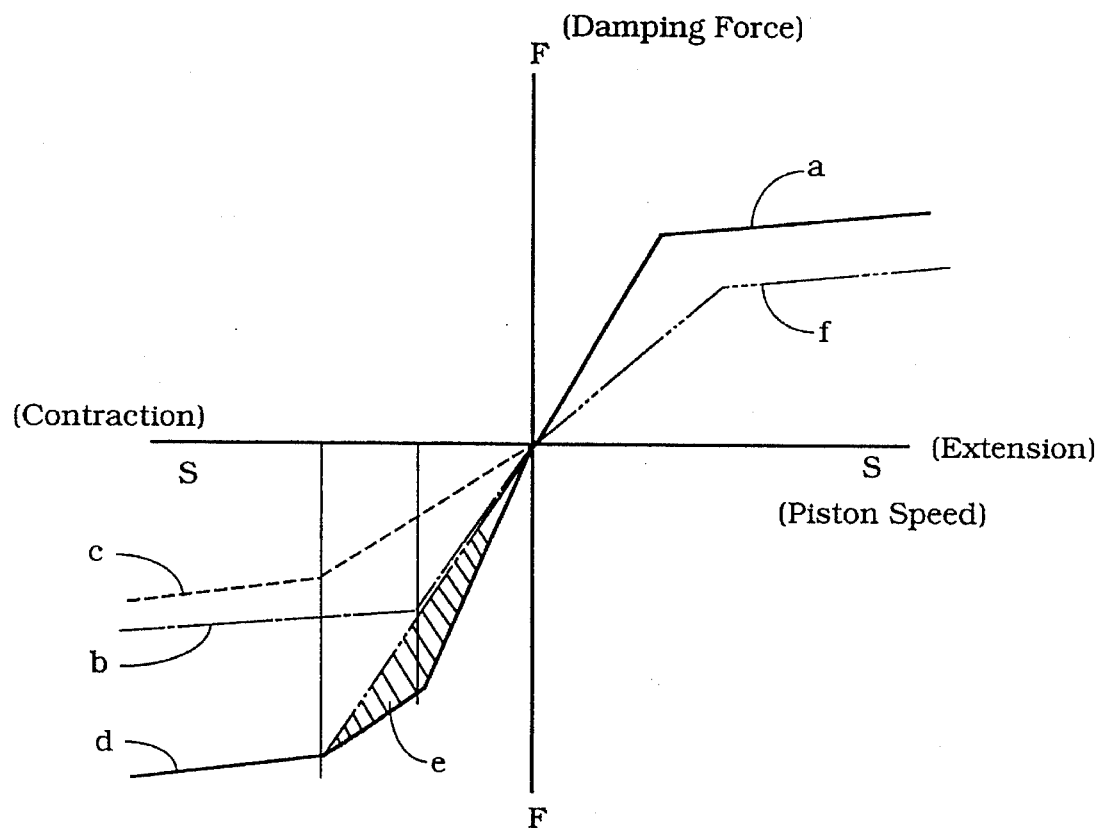
FIG. 2 is a damping diagram showing how the embodiment of FIG. 1 provides more effective damping than convention types of tubular shock absorbers.

Referring first to FIGS. 1 and 2, a shock absorber constructed in accordance with a first embodiment of the invention is identified generally by the reference numeral 11. The first shock absorber 11 includes an inner cylinder 12 that is closed at its opposite ends in a suitable manner by end caps 13 and 14. A piston 15 is slidably supported within a cylinder bore 16 formed by the inner cylinder 12 and divides the inner cylinder 12 into an upper or first fluid chamber 17 and a lower or second fluid chamber 18. The chambers 17 and 18 are filled with a suitable hydraulic fluid.

A piston rod 19 is affixed in a suitable manner to the piston 15 and extends through the chamber 17 and end cap 14 to provide an end portion 21 that is affixed to one of two relatively movable elements, the movement of which is to be damped by the shock absorber 11. In a typical embodiment of this invention, the piston rod 21 may be connected to a vehicle body in a well known manner. The cylinder 12 and specifically its end cap 13 is affixed to a wheel suspending element of the vehicle so that the piston 15 will be displaced upon movement of the wheel relative to the vehicle body, as is well known in this art.

A shock absorbing valve assembly comprised of a check valve 22 and a flow restricting valve 23 are disposed in the piston 15 for permitting flow from the chamber 17 to the chamber 18 upon expansion of the piston 15 within the cylinder 12 caused by upward movement of the piston rod 21. It should be noted that during such upward movement fluid will be displaced from the chamber 17 into the chamber 18 and the amount of fluid displaced will be equivalent to the difference between the diameter of the cylinder bore 16 and the outer peripheral diameter of the piston rod 19 and the distance of travel. The lower chamber 18 does not have a piston rod in it and the fluid displaced from the chamber 17 will not be sufficient to make up this volume. For this reason, it is the practice to employ an accumulator or reservoir type of device, indicated generally by the reference numeral 24 which communicates with the lower chamber 18 through a conduit 25. The reservoir 24 has an internal volume that is partially filled with a hydraulic fluid 26 and which is contained above a floating piston 27 which is maintained in contact with the fluid by means of high pressure gas contained in a chamber 28 beneath the piston 27. Normally, nitrogen gas is provided for this purpose. A relatively light check valve 29 permits free flow from the fluid chamber 28 to the chamber 18 when the upward movement of the piston 15 occurs, as aforenoted.

As with a conventional type of shock absorber, a restricted orifice or flow controlling valve 31 is disposed so as to permit flow from the chamber 18 back into the accumulator chamber 26 when the piston 15 moves downwardly. The valve 31 is normally provided to control the damping force on the movement of the suspended elements in this direction. As has been previously noted, that can provide certain disadvantages as may be understood by reference to FIG. 2. When the piston 15 is moving downwardly, fluid will be displaced from the chamber 18 to the upper chamber 17 through a light check valve 30. However, more fluid will be displaced from the chamber 18 then can be accommodated in the chamber 17 because of the fact that the piston rod 19 only extends through the chamber 17. Hence, the excess fluid will be displaced back to the reservoir 24 through the valve 31, as aforenoted to provide the normal damping action.

In FIG. 2, the solid line curve A shows the damping force in response to speed of the piston 15 in the extension direction and this is the desired degree of damping. However, in order to provide the desired degree of damping with a conventional shock absorber operating in the opposite or contractioned direction, it must be necessary to either increase the diameter of the piston rod 19 or substantially restrict the size of the orifice 31 in which case the damping curve as shown by the curve c-f will result. Hence, it is not possible with conventional constructions to provide the desired degree of damping in both directions.

In accordance with the invention, therefore, an outer cylinder 32 is telescopically received around the inner cylinder 12 and defines there between a third fluid chamber 33. This chamber 33 is closed at its lower end by the end plate 13. An annular piston 34 is affixed for movement with the upper end of the piston rod 19 by an end plate 35 of a disk-like configuration. The upper end of the chamber 33 around this annular piston 34 is sealed by means of a pair of annular inner and outer seals 36 and 37 which are disposed between the inner periphery of the annular piston 34 and the enclosure 14 and the outer periphery of the annular piston 34 and the outer cylinder 32, respectively.

This construction provides an air volume 38 between the disk 35, inner periphery of the annular piston 34 and end plate 14. An atmospheric vent 39 having a filter 41 permits air to flow in and out of this chamber 38 without restriction.

A pair of cylindrical guides 42 and 44 are disposed between the inner periphery of the outer cylinder 32 and the outer periphery of the annular piston 34 so as to support its sliding movement. This defines an outer chamber 45 between the outer periphery of the annular piston 34 and the outer shell 32. A fluid passage 46 extends through a lower portion of the annular piston 34 so that the entire chamber 33 may be filled with hydraulic fluid. This hydraulic fluid may be of a different nature than the hydraulic fluid which fills the chambers 17 and 18 of the inner cylinder 12 so as to provide different degrees of damping, if desired.

A second accumulator chamber or reservoir 47 is provided which communicates with the annular third fluid chamber 33 through a conduit 48. Like the reservoir 24, the reservoir 47 has a fluid chamber 49 which is filled with the same fluid as the third fluid chamber 33. A floating piston 51 urged by a compressed inert gas such as nitrogen within a chamber 52 normally maintains the fluid tight relationship.

There is provided a damping arrangement for controlling the flow from the third chamber 33 to the reservoir chamber 49 and this includes a damping type of valve 53 which may comprise a fixed or variable-orifice and which has damping curve as shown by the curve b in FIG. 2. That is, when the piston rod 21 is moving downwardly to drive the piston 15 downwardly, at the same time, the annular piston 34 will move downwardly and displace fluid from the third fluid chamber 33 through the damping valve 53 into the reservoir chamber 49. Hence, the damping force in this construction in the contraction direction thus is the sum of the damping force c provided by the restriction or shock-absorbing valve 31 (curve b) and that of the damping or shock absorber valve 53 (curve c) which combined curve is shown at d. Hence, a greater degree of damping as indicated by the shaded line area c in FIG. 2 is possible with this arrangement.

When the piston 15 is moving upwardly, fluid can reenter the third fluid chamber 33 from the reservoir chamber 49 through a relatively light check valve 54.

Figure 3:
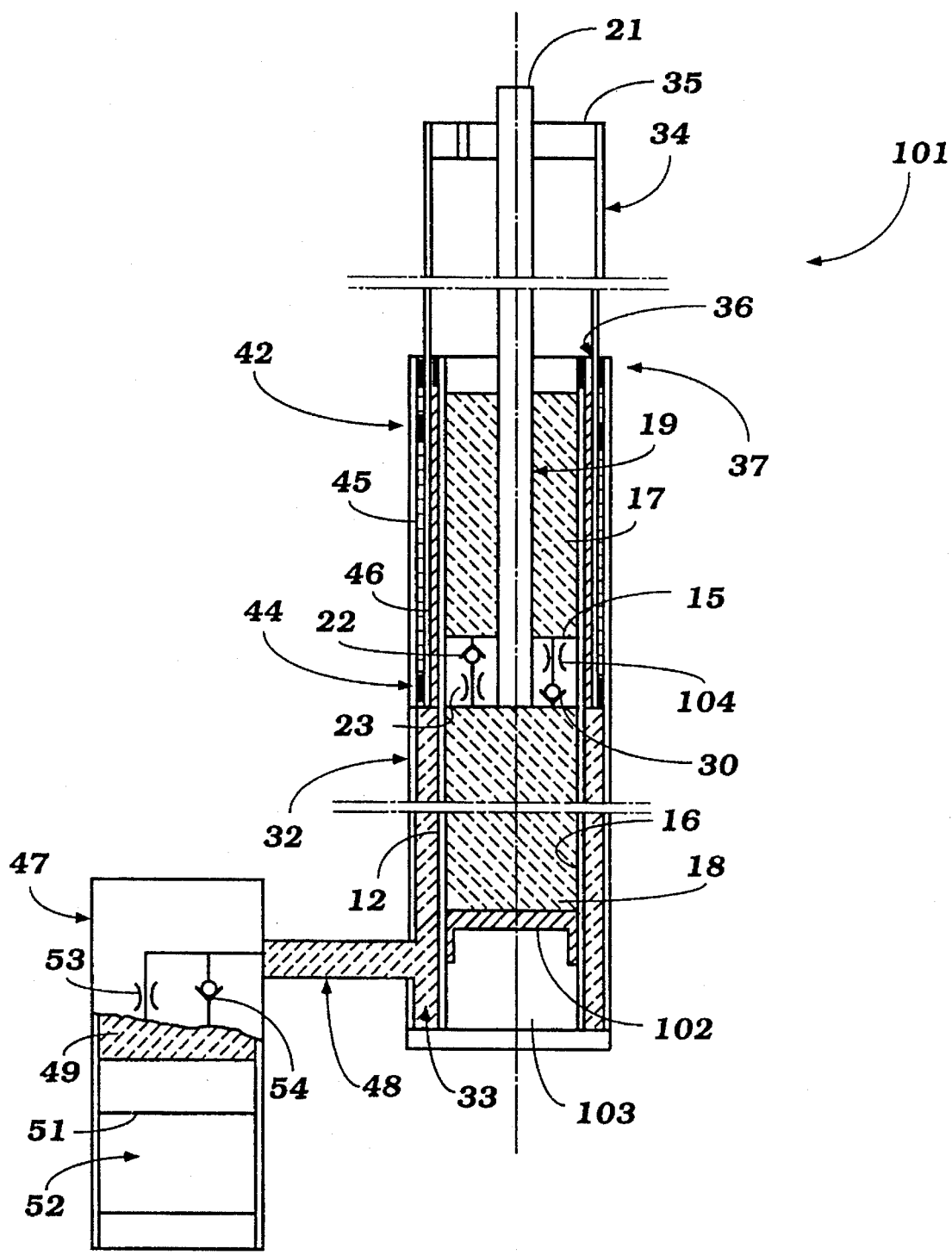
FIG. 3 is a partially schematic cross-sectional view, in part similar to FIG. 1, and shows a second embodiment of the invention.

A shock absorber constructed in accordance with a second embodiment of the invention is shown in FIG. 3 and is identified generally by the reference numeral 101. The shock absorber 101 differs from the shock absorber 11 of the embodiment of FIGS. 1 and 2 only in the way in which makeup fluid is supplied to the chamber 18 so as to accommodate the different displacement of the piston rod 19. For that reason, components of this embodiment which are the same as the previously described embodiment have been identified by the same reference numeral and will be described again only insofar as is necessary to understand the construction and operation of this embodiment.

In this embodiment, a floating piston 102 is provided at the lower end of the lower chamber 18 and is held in position by means of high pressure gas contained within a chamber 103. In this embodiment, a shock absorbing valve or orifice 104 is positioned in the piston 15 upstream of the check valve 30. Hence, when the piston 15 moves upwardly makeup volume will be created in the chamber 18 by expansion upwardly of the piston 102 under the action of the gas in the chamber 103. When the piston 15 is forced downwardly, the check valve 30 will open and the fluid displaced by the area of the piston rod 19 will flow through the restricting orifice 104 so as to provide a damping like the curve c in FIG. 2.

Figure 4:
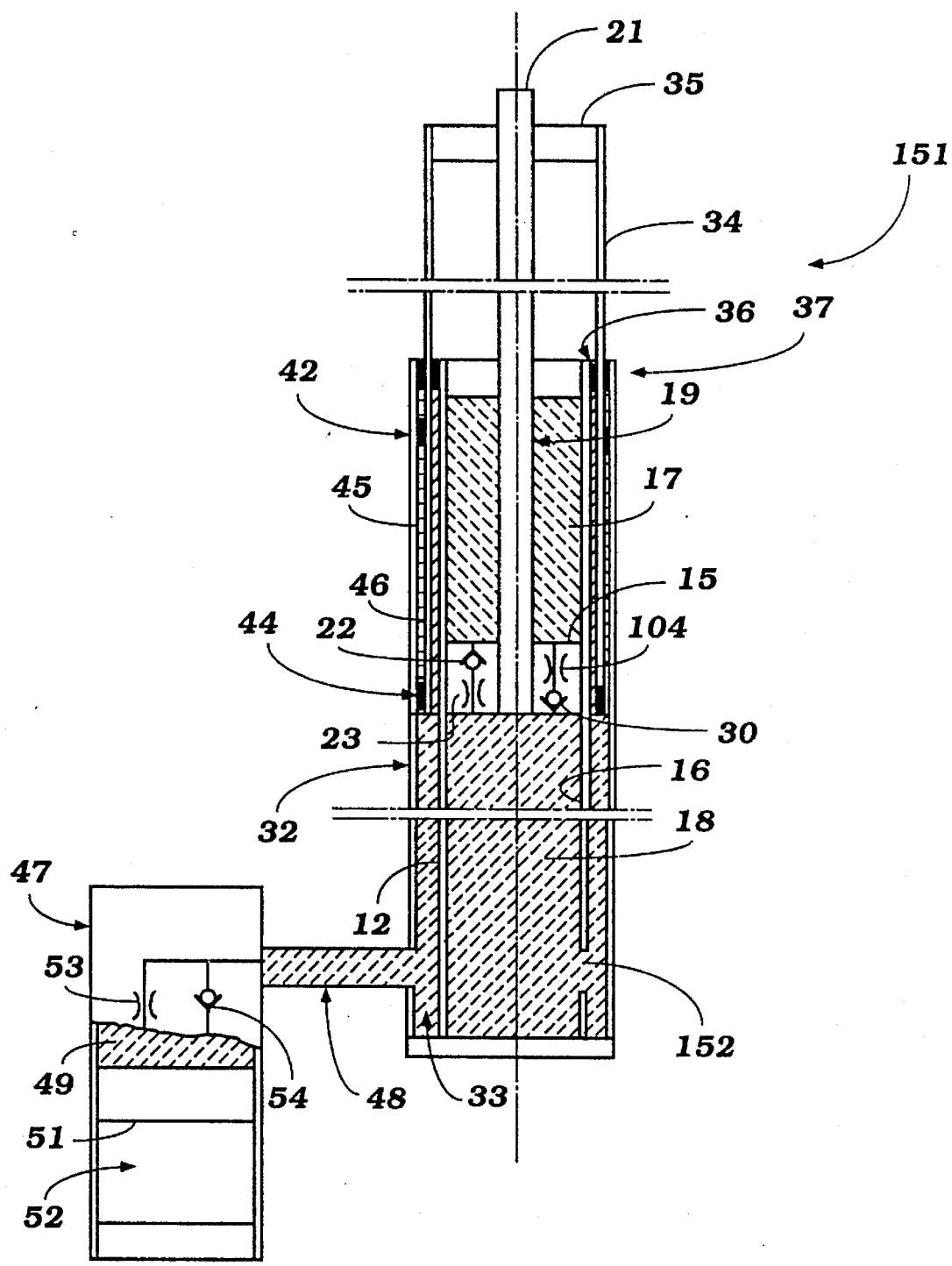
FIG. 4 is a partially schematic cross-sectional view in part similar to FIGS. 1 and 3, and shows a third embodiment of the invention.

A shock absorber constructed in accordance with a third embodiment of the invention is shown in FIG. 4 and is identified generally by the reference numeral 151. This shock absorber 151 differs from the previously described embodiments in that a single reservoir is provided for both of the fluid chambers 18 and 33 and to this end these chambers communicate with each other and hence must be filled with the same type of hydraulic fluid, unlike those of the previously described embodiments. Since the construction of this embodiment is substantially the same as that of FIG. 3, components which are the same as in that embodiment have been identified by the same reference numerals and will not be described again.

In this embodiment, a fluid passageway 152 extends between the lower end of the chamber 18 and the chamber 33. Hence, when the piston 19 is moving upwardly fluid makeup for compensating for the displacement of the piston rod 19 can fill the chamber 18 from the reservoir 47 in addition to filling the chamber 33 to make up for the lost displacement of the annular piston 33. In all other regards this embodiment operates like those previously described and also permits the use of damping forces as shown in FIG. 2. It is believed that those skilled in the art can readily understand the construction and operation of this embodiment from the foregoing descriptions.

Figure 5:
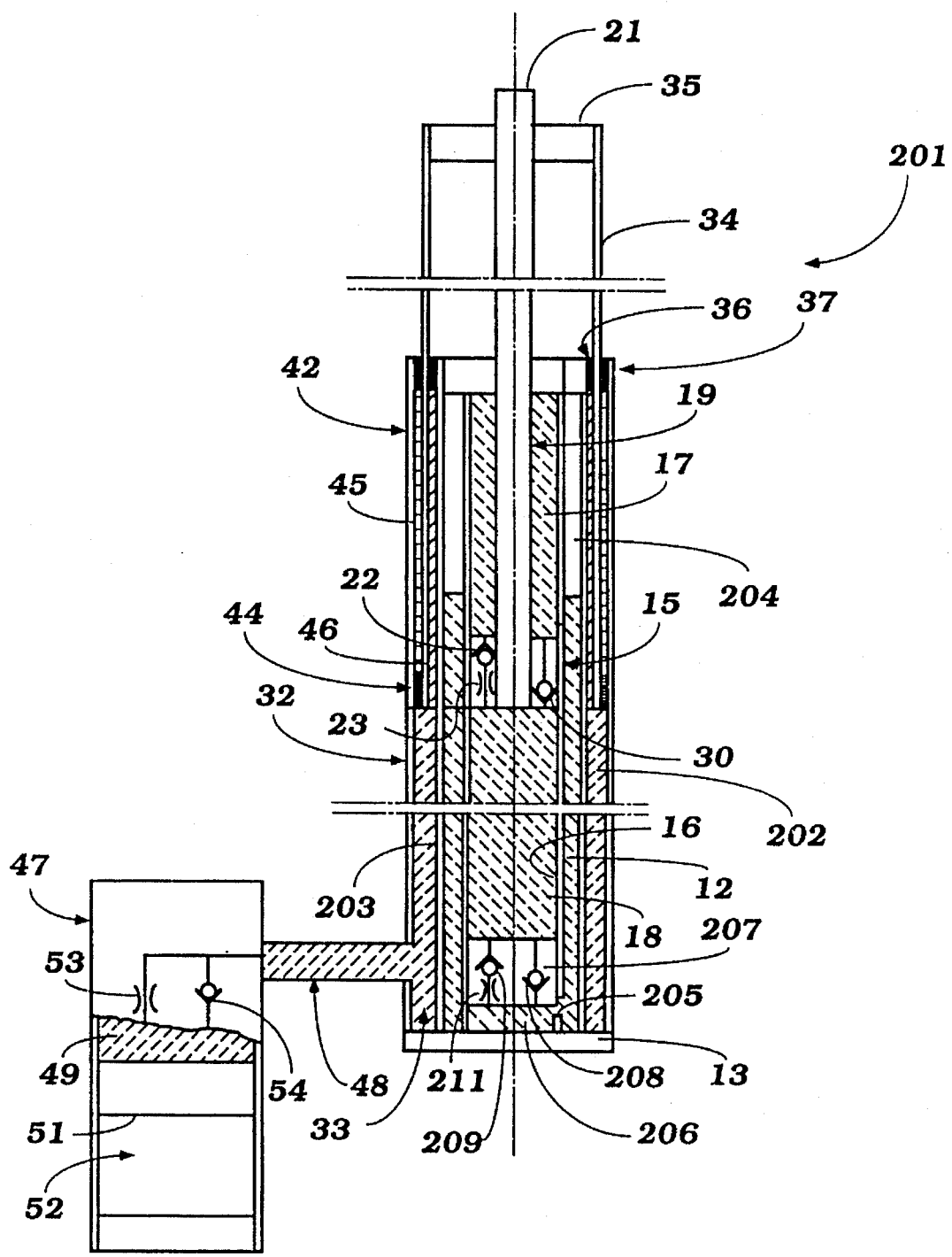
FIG. 5 is a partially schematic cross-sectional view, in part similar to FIGS. 1, 3 and 4, and shows a fourth embodiment of the invention.

A shock absorber constructed in accordance with a fourth embodiment of the invention is depicted in FIG. 5 and is indicated generally by the reference numeral 201. This shock absorber 201 is similar to the previously described embodiments and differs from those embodiments only in the way the reservoir is provided for the lower shock absorbing chamber 18 of the inner cylinder 12. For that reason, components of this embodiments which are the same as those previously described are substantially the same have again been identified by the same reference numerals and will be described again only insofar as is necessary to understand the construction and operation of this embodiment.

In this embodiment, an intermediate annular cylinder 202 is interposed between the outer surface of the inner cylinder 12 and the inner surface of the outer cylinder 32. Thus, the third fluid chamber 33 is defined between the outer surface of the intermediate cylinder 202 and the inner surface of the outer cylinder 32. The area between the inner surface of the intermediate cylinder 202 and the outer surface of the inner cylinder 12 defines a reservoir volume 203 which is partially filled with hydraulic fluid. A chamber 204 above this fluid is filled with an inert gas such as nitrogen under relatively high pressure.

An opening 205 in the lower portion of the inner cylinder 12 communicates this reservoir chamber 203 with a further chamber 206 formed beneath a piston 207 fixed to the inner cylinder 12. This piston 207 is provided with a check valve 208 which permits free flow from the chamber 206 to the chamber 18 and a combined check valve 209 and a shock absorber valve or restriction 211 which permits damping flow from the chamber 18 to the reservoir chamber 206 as with the previously described embodiments upon downward movement of the piston 15. Hence, this embodiment has all of the advantages of those previously described and also provides a more compact construction.

It should be readily apparent from the foregoing description that the described embodiments of the invention are effective in providing shock absorbers of the tubular type which permits control and the desired degree of damping in each direction of movement. Of course, the foregoing description is that of preferred embodiments of the invention and various changes and modifications may be made without departing from the spirit and scope of the invention, as defined by the appended claims.

I claim:

1. A tubular shock absorber comprised of an inner cylinder defining a bore closed at opposite ends and in which a first piston is supported for reciprocation, said first piston dividing said cylinder bore into first and second fluid chambers, a piston rod affixed to said first piston and extending through said first fluid chamber for connection to a first element, means for connecting said inner cylinder to a second element, said first and said second elements being relatively moveable for causing movement of said first piston within said cylinder bore, an outer cylinder fixed telescopically to said inner cylinder and defining an annular chamber there around, a second piston, said second piston having an annular configuration received in said outer cylinder and extending circumferentially therearound to define at least a third fluid chamber of annular configuration, means coupling with said first piston to said second piston for movement with said first piston for at least a portion of the stroke of said first piston, such movement of said second piston displacing fluid from said third fluid chamber upon movement of said piston rod in a first direction for compression of fluid in said second fluid chamber by said first piston, a reservoir chamber for receiving fluid displaced from said third fluid chamber, first damping valve means in said first piston for restricting the flow from said first fluid chamber to said second fluid chamber for damping the movement of said first and second elements in one direction, and second damping valve means for restricting the flow of fluid from said third fluid chamber to said reservoir chamber for damping the movement of said first and said second elements in a direction opposite to the one direction.

2. The tubular shock absorber as set forth in claim 1, further including check valve means for permitting substantially unrestricted flow from said reservoir chamber to said third fluid chamber and from said second fluid chamber to said first fluid chamber.

3. The tubular shock absorber as set forth in claim 1, further including third damping valve means for permitting flow from the second fluid chamber upon movement of the first piston in the first direction so as to provide damping in addition to that provided by the flow from the third fluid chamber to the reservoir chamber.

4. The tubular shock absorber as set forth in claim 3, wherein the third damping valve means controls flow from the second fluid chamber to a second fluid reservoir.

5. The tubular shock absorber as set forth in claim 4, further including check valve means for permitting flow from the second fluid reservoir to the second fluid chamber.

6. The tubular shock absorber as set forth in claim 5, further including check valve means in the piston for permitting flow from the second fluid chamber to first the first fluid chamber while precluding flow from the first fluid chamber to the second fluid chamber.

7. The tubular shock absorber as set forth in claim 6, further including check valve means for precluding flow from the third fluid chamber to the reservoir chamber in permitting flow from the reservoir chamber to the third fluid chamber.

8. The tubular shock absorber as set forth in claim 3, wherein the third damping valve means is positioned in the first piston to the first fluid chamber.

9. The tubular shock absorber as set forth in claim 8, further including a third piston floating in the second fluid chamber dividing the second fluid chamber into a fluid chamber portion and a pressurized portion containing a high pressure gas.

10. The tubular shock absorber as set forth in claim 9, further including check valve means for permitting flow from the reservoir chamber to the third fluid chamber and precluding flow from the third fluid chamber to the reservoir.

11. The tubular shock absorber as set forth in claim 5, wherein the second fluid reservoir is formed concentrically with the inner and outer cylinders by means of an intermediate cylinder disposed therebetween.

12. The tubular shock absorber as set forth in claim 11, wherein the reservoir chamber communicates with the second fluid chamber via a fixed piston fixed in the second fluid chamber.

13. The tubular shock absorber as set forth in claim 12, wherein there is a check valve in the fixed piston for permitting flow from the reservoir chamber to the second fluid chamber and a shock absorber valve for permitting flow from the second fluid chamber to the reservoir chamber.

* * * * *